US012706638B2

(12) United States Patent
Caporal Del Barrio et al.

(10) Patent No.: US 12,706,638 B2
(45) Date of Patent: Aug. 11, 2026

(54) METHOD FOR BEAM DISTRIBUTION

(71) Applicant: Nokia Technologies Oy, Espoo (FI)

(72) Inventors: Samantha Caporal Del Barrio, Aalborg (DK); Simon Svendsen, Aalborg (DK); Christian Rom, Aalborg (DK); Benny Vejlgaard, Gistrup (DK); Ali Karimidehkordi, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/706,030

(22) PCT Filed: Nov. 2, 2021

(86) PCT No.: PCT/EP2021/080363

§ 371 (c)(1),
(2) Date: Apr. 30, 2024

(87) PCT Pub. No.: WO2023/078525

PCT Pub. Date: May 11, 2023

(65) Prior Publication Data

US 2024/0429975 A1 Dec. 26, 2024

(51) Int. Cl.
*H04B 7/0413* (2017.01)
*H04W 72/20* (2023.01)

(52) U.S. Cl.
CPC .......... *H04B 7/0413* (2013.01); *H04W 72/20* (2023.01)

(58) Field of Classification Search
CPC ............................ H04B 7/0413; H04W 72/20
See application file for complete search history.

(56) References Cited

U.S. PATENT DOCUMENTS

2019/0058517 A1 2/2019 Kang et al.
2022/0077985 A1* 3/2022 Horn .................... H04L 5/0048

FOREIGN PATENT DOCUMENTS

WO 2021062810 A1 4/2021
WO 2021126055 A1 6/2021

OTHER PUBLICATIONS

Fernandes, F. et al., “Beam Management in mmWave 5G NR: an Intra-Cell Mobility Study,” 2021 IEEE 93rd Vehicular Technology Conference (VTC2021-Spring), pp. 1-7.

(Continued)

*Primary Examiner* — Rahel Guarino
(74) *Attorney, Agent, or Firm* — McCarter & English LLP

(57) ABSTRACT

An apparatus including: one or more antenna panels, each including a plurality of antenna elements; circuitry for receiving a reference signal burst including channel synchronization signal blocks and/or state information reference signals on a downlink channel, wherein the reference signal burst is periodically received for a predetermined number of repetition times within a sample; circuitry for estimating, based on values of consecutive repetitions of the reference signal burst, a dynamic state of the downlink channel; circuitry for distributing, at least partly based on the dynamic state of the downlink channel, repetitions of the channel state information reference signals across said antenna panels; and circuitry for determining settings of uplink and downlink channel configurations across said antenna panels according to determined distribution of said repetitions of the channel state information reference signals to be used according to changes at least in the dynamic state of the downlink channel.

25 Claims, 7 Drawing Sheets

(56) References Cited

OTHER PUBLICATIONS

Abinader, F. et al., "System-Level Analysis of mmWave 5G Systems with Different Multi-Panel Antenna Device Models," 2021 IEEE 93rd Vehicular Technology Conference (VTC2021-Spring), pp. 1-6.

Nokia et al., "CSI-RS L1-RSRP Measurement Period Requirements," 3GPP TSG-RAN WG4 Meeting#90bis, R4-1903933, Xi-an, China, Apr. 8-12, 2019.

* cited by examiner

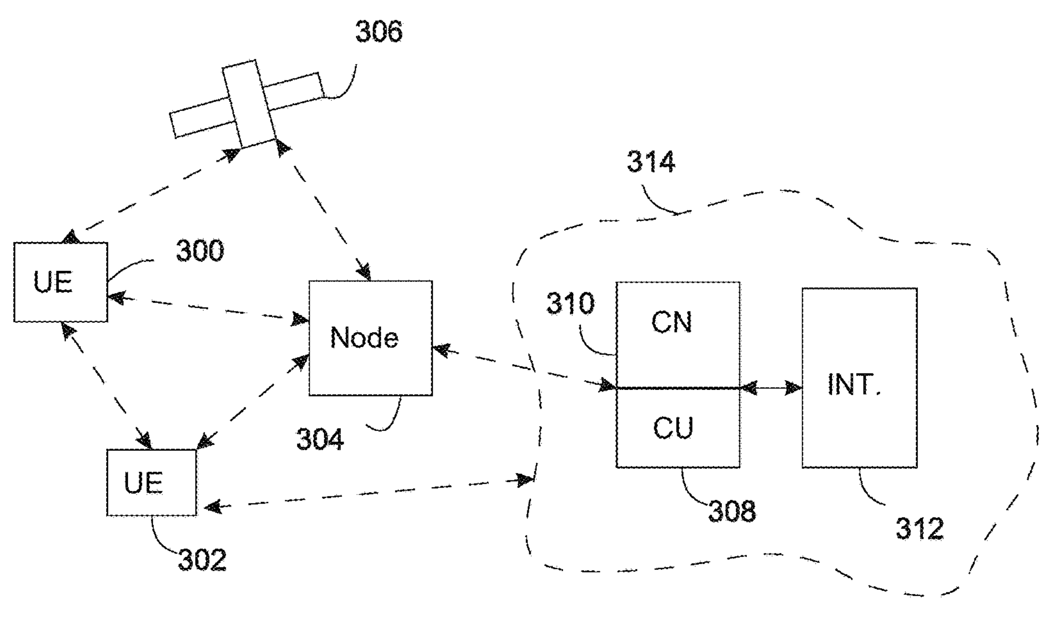
FIG. 3
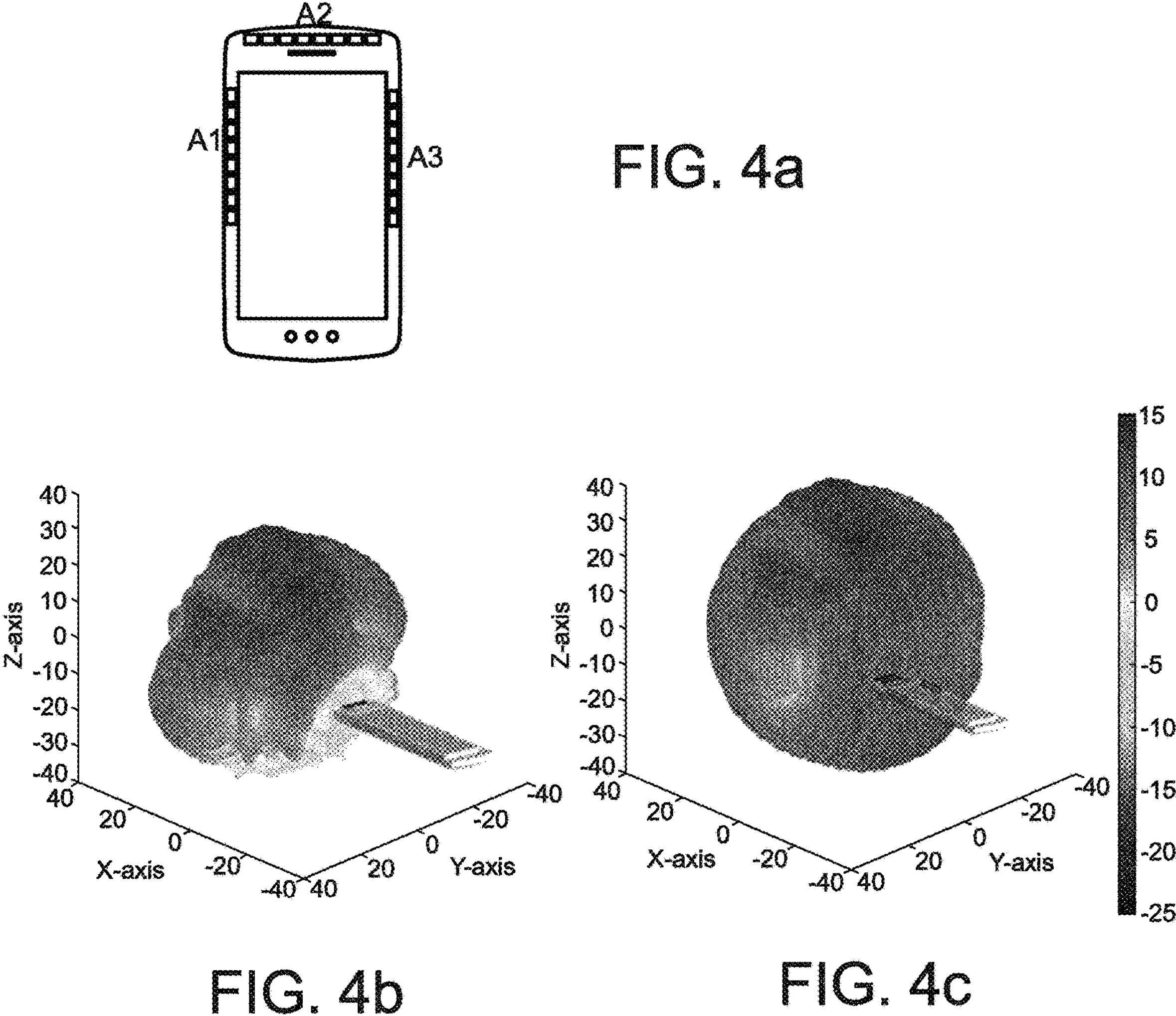
FIG. 4a
FIG. 4b
FIG. 4c

```
- - ASN1START
- - TAG-NZP-CSI-RS-RESOURCESET-START
NZP-CSI-RS-ResourceSet ::=          SEQUENCE {
    nzp-CSI-ResourceSetId               NZP-CSI-RS-ResourceSetId,
    nzp-CSI-RS-Resources                SEQUENCE (SIZE (1..maxNrofNZP-CSI-RS-ResourcesPerSet)) OF NZP-CSI-RS-ResourceId,
    repetition                          ENUMERATED { on, off }                         OPTIONAL,   -- Need S
    aperiodicTriggeringOffset           INTEGER(0..6)                                  OPTIONAL,   -- Need S
    trs-Info                            ENUMERATED {true}                              OPTIONAL,   -- Need R
    ...,
    [[
    aperiodicTriggeringOffset-r16       INTEGER(0..31)                                 OPTIONAL    -- Need S
    ]]
}
 - - TAG-NZP-CSI-RS-RESOURCESET-STOP
 - - ASN1STOP
```

FIG. 7a

```
- - ASN1START
- - TAG-NZP-CSI-RS-RESOURCEID-START

NZP-CSI-RS-ResourceId ::=          INTEGER (0..maxNrofNZP-CSI-RS-Resources-1)

- - TAG-NZP-CSI-RS-RESOURCEID-STOP
- - ASN1STOP
```

FIG. 7b

A
B
C
Scheme 1
Scheme 2
Scheme 3
3-4-5
Serving
6-7-8
1-2-3
4-5
8
6
4
2
3
5
7
1

METHOD FOR BEAM DISTRIBUTION

CROSS REFERENCE TO RELATED APPLICATION

This patent application is a U.S. National Stage application of International Patent Application Number PCT/EP2021/080363 filed Nov. 2, 2021, which is hereby incorporated by reference in its entirety.

TECHNICAL FIELD

The present invention relates to beam distribution procedures.

BACKGROUND

One of the new service categories introduced in 5G NR networks is ultra-reliable low-latency communication (URLLC). The two latest versions of the 5G standard, 3GPP Release 15 and 16, have built the physical implementation of URLLC to meet the two conflicting requirements of reliability and latency.

Especially when considering the operating of a user equipment (UE) in the Frequency Range 2 (FR2; 24.25 GHz to 52.6 GHz) including the mmWave range, the UE implementation is expected to have multiple antenna panels to perform beam steering over a large solid angle aiming to maximize the reliability. The UE may be configured with multiple beam configurations across the panels and needs to align its narrow beam via a narrow beam alignment procedure based on reference signals sent by a network element, such as a base station, gNodeB (gNb).

The scheduling of the reference signals is fully controlled by the network and are sent in an aperiodic fashion. Hence, the UE is limited to waiting for the gNB to schedule such reference signals in order to align its narrow beam for reception. However, the gNB does not have dynamic information on internal beam and antenna panel management of the UE, and as a result, the gNB may allocate and schedule the reference signals in a suboptimal manner.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising a plurality of antenna panels, each antenna panel comprising a plurality of antenna elements; means for receiving a reference signal burst comprising a plurality of channel synchronization signal blocks and/or state information reference signals on a downlink channel, wherein the reference signal burst is periodically received for a predetermined number of repetition times within a sample; means for estimating, based on values of two or more consecutive repetitions of the reference signal burst, a dynamic state of the downlink channel; means for distributing, at least partly based on the dynamic state of the downlink channel, repetitions of the channel state information reference signals across said one or more antenna panels; and means for determining one or more settings of uplink and downlink channel configurations across said one or more antenna panels according to determined distribution of said repetitions of the channel state information reference signals to be used according to changes at least in the dynamic state of the downlink channel.

According to an embodiment, the apparatus comprises means for measuring received signal power level of said two or more consecutive repetitions of the reference signal burst using said one or more antenna panels in alternating manner; and means for determining candidate antenna panels for the downlink channel reception, wherein said candidate antenna panels include the antenna panel with the best value of the received signal power level and zero or more further antenna panels having the value of the received signal power level within a first predetermined threshold from the best value of the received signal power level.

According to an embodiment, the dynamic states of the downlink channel comprise at least the following: a directive channel, a semi-static channel, a dynamic channel.

According to an embodiment, said means for estimating the dynamic state of the downlink channel comprise means for measuring the received signal power level of said two or more consecutive repetitions of the reference signal burst using one antenna panel; and means for determining the dynamic state of the downlink channel based on whether values of the received signal power level of said two or more consecutive repetitions of the reference signal burst remain within a second predetermined threshold; wherein at least one value exceeding said second threshold indicates a dynamic downlink channel and all values remaining within said second threshold indicates a semi-static and/or directive downlink channel.

According to an embodiment, the reference signal burst is a synchronization signal burst.

According to an embodiment, said means for distributing are configured to, in response to estimating that the downlink channel is in a semi-static state, distribute said repetitions of the channel state information reference signals across all beams of at least one candidate antenna panel.

According to an embodiment, said means for distributing are configured to, in response to estimating that the downlink channel is in a directive state, distribute said repetitions of the channel state information reference signals across adjacent beams of a downlink serving beam.

According to an embodiment, said means for distributing are configured to, in response to estimating that the downlink channel is in a dynamic state, distribute said repetitions of the channel state information reference signals across all beams of all candidate antenna panels.

According to an embodiment, the apparatus comprises means for adapting, in response to the number of said repetitions of the channel state information reference signals scheduled by a network is smaller than the number of beams available for downlink channel reception, beamwidth of the beams available for downlink channel reception such that a desired angle of arrival is scannable with the beams available for downlink channel reception.

According to an embodiment, the apparatus comprises means for determining that an operating state of the apparatus requires savings in power consumption, wherein said means for determining candidate antenna panels are configured to include only the antenna panel with the best value of the received signal power level.

According to an embodiment, the apparatus comprises means for averaging, for each active antenna panel, the received signal power level of the synchronization signal blocks over a plurality of consecutive synchronization signal bursts.

According to an embodiment, the apparatus comprises means for determining whether to apply Layer 1 averaging.

An apparatus according to a second aspect comprises: a plurality of antenna panels each antenna panel comprising a plurality of antenna elements, at least one processor and at least one memory, said at least one memory stored with computer program code thereon, the at least one memory and the computer program code configured to, with the at least one processor, cause the apparatus at least to perform: receive a reference signal burst comprising a plurality of channel synchronization signal blocks and/or state information reference signals on a downlink channel, wherein the reference signal burst is periodically received for a predetermined number of repetition times within a sample; estimate, based on values of two or more consecutive repetitions of the reference signal burst, a dynamic state of the downlink channel; distribute, at least partly based on the dynamic state of the downlink channel, repetitions of the channel state information reference signals across said one or more antenna panels; and determine one or more settings of uplink and downlink channel configurations across said one or more antenna panels according to determined distribution of said repetitions of the channel state information reference signals to be used according to changes at least in the dynamic state of the downlink channel.

A method according to a third aspect comprises receiving, by a user equipment comprising one or more antenna panels, each antenna panel comprising a plurality of antenna elements, a reference signal burst comprising a plurality of synchronization signal blocks and/or channel state information reference signals on a downlink channel, wherein the reference signal burst is periodically received for a predetermined number of repetition times within a sample; estimating, based on values of two or more consecutive repetitions of the reference signal burst, a dynamic state of the downlink channel; distributing, at least partly based on the dynamic state of the downlink channel, repetitions of the channel state information reference signals across said one or more antenna panels; and determining one or more settings of uplink and downlink channel configurations across said one or more antenna panels according to determined distribution of said repetitions of the channel state information reference signals to be used according to changes at least in the dynamic state of the downlink channel.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which:

FIG. 3 shows a part of an exemplifying radio access network;

FIG. 4*a* an example of a UE with multiple antenna panels;

FIGS. 4*b* and 4*c* show examples of the spherical coverage of a single panel UE and the spherical coverage of a 3-panel UE, respectively;

FIGS. 7*a* and 7*b* show examples of information elements used for informing the UE about reference signals to be used in beam management operations;

DETAILED DESCRIPTION OF SOME EXAMPLE EMBODIMENTS

The following describes in further detail suitable apparatus and possible mechanisms carrying out the beam distribution. While the following focuses on 5G networks, the embodiments as described further below are by no means limited to be implemented in said networks only, but they are applicable in any network supporting beam distribution.

Figure 1:
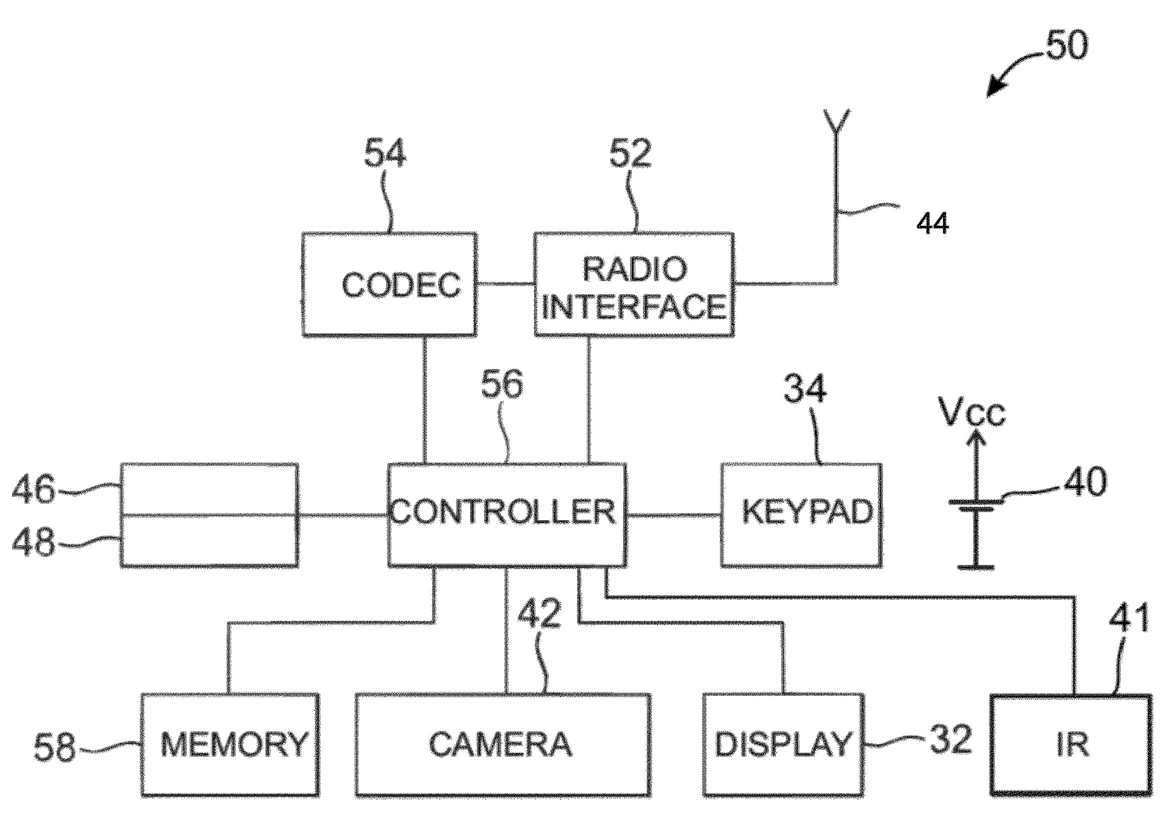
FIG. 1 shows a schematic block diagram of an apparatus for incorporating a beam distribution arrangement according to the embodiments.
Figure 2:
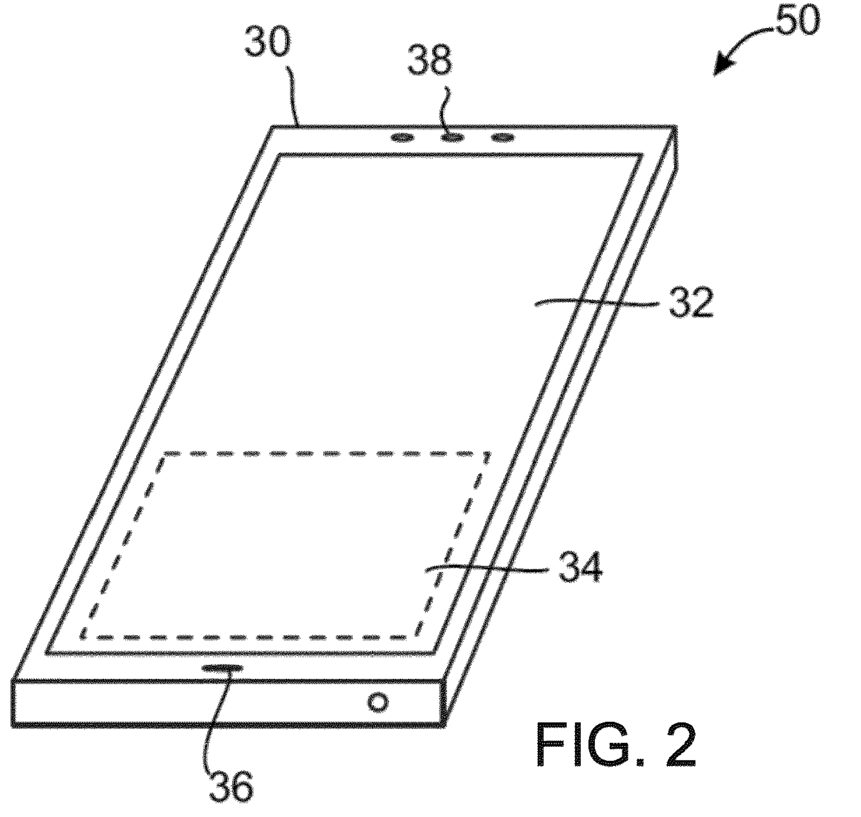
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50, which may incorporate the arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g) nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

For the 5G technology, one of the most important design goals has been improved metrics of reliability and latency, in addition to network resilience and flexibility.

Especially when considering the operating of the UE in the Frequency Range 2 (FR2; 24.25 GHz to 52.6 GHZ) including the mmWave range, the UE implementation is expected to have multiple antenna panels (Multi-Panel UE, MPUE) to perform beam steering over a large solid angle aiming to maximize the reliability. FIG. 4*a* shows an example of a UE with multiple panels A1, A2, A3, each panel consisting of an antenna array comprising a plurality of antenna elements, such as an array of 1×8 antenna elements. FIGS. 4*b* and 4*c*, in turn, show a comparison of the spherical coverage of a single panel UE and the spherical coverage of a 3-panel UE, respectively. Based on FIGS. 4*b* and 4*c*, it is obvious that multi-panel operation is required to optimize the spherical coverage of a UE at mmWave frequencies. A single panel UE can only transmit/receive from a limited number of angles.

Figure 5:
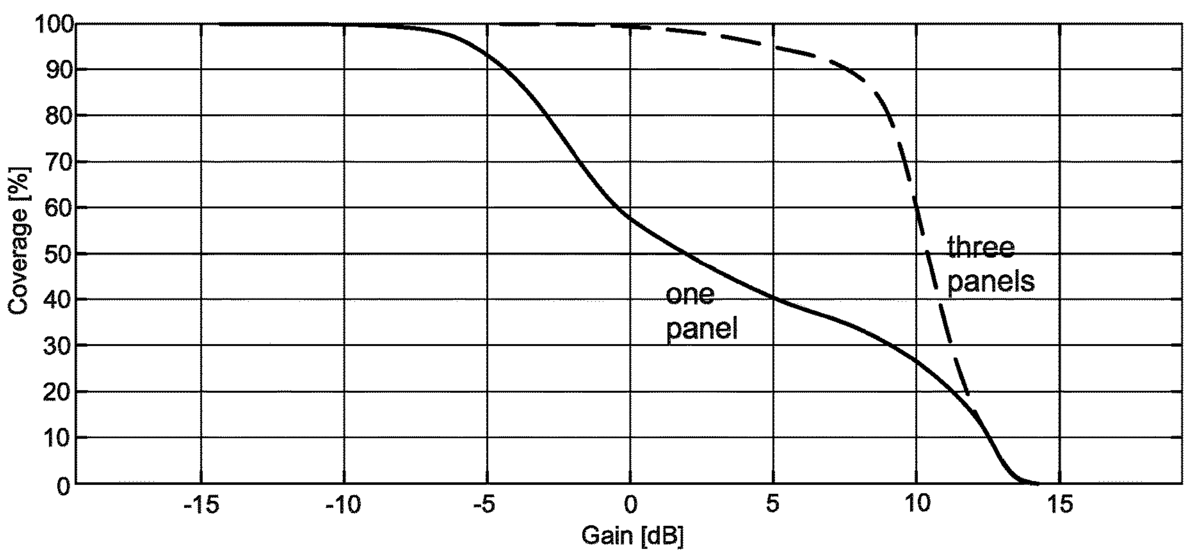
FIG. 5 shows a comparison of the achievable spherical coverage of a UE with one or three panels.

This is further confirmed by FIG. 5, which plots a comparison of the achievable spherical coverage of a UE with one or three panels (each of them being 8×1 patch arrays). As shown in FIG. 5, with a single array (only the front panel) on the UE, only 25% of the sphere is covered with 10 dB, whereas with 3 arrays (all three panels) on the UE, about 60% of the directions can be reached with a 10 dB gain.

Figure 6:
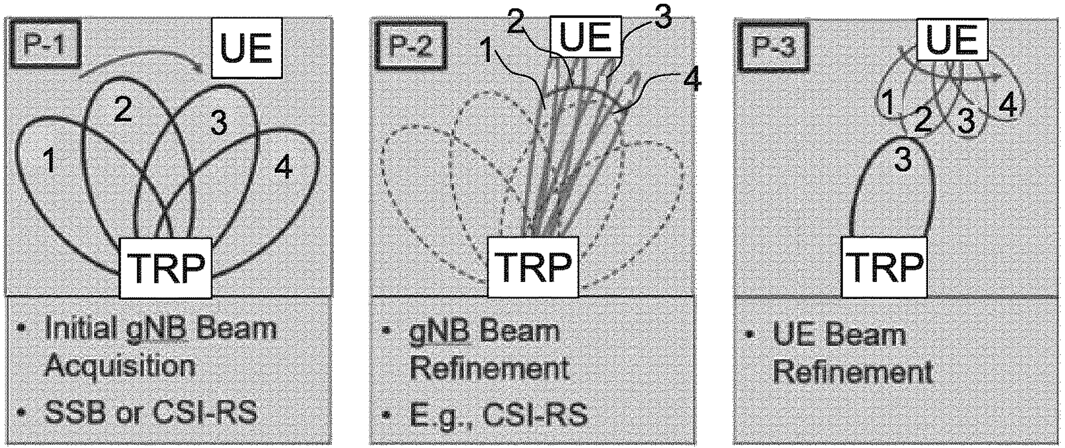
FIG. 6 shows an example of radio beam alignment procedure between the gNB and the UE for both reception and transmission (Rx/Tx)

When the UE is operating in Frequency Range 2 (FR2), the radio beam alignment procedure between the gNB and the UE for both reception and transmission (Rx/Tx) includes the following steps with the corresponding phases P-1, P-2 and P-3 identified in FIG. 6:

a) P-1 is used to enable UE measurement on different TRP Tx beams to support selection of TRP Tx beams/UE Rx beam(s)

For beamforming at TRP, it typically includes an intra/inter-TRP Tx beam sweep from a set of different beams. For beamforming at UE, it typically includes a UE Rx beam sweep from a set of different beams.

b) P-2 is used to enable UE measurement on different TRP Tx beams to possibly change inter/intra-TRP Tx beam (s)

P-2 may be performed from a possibly smaller set of beams for beam refinement than in P-1. It is noted that P-2 can be a special case of P-1.

c) P-3 is used to enable UE measurement on the same TRP Tx beam to change UE Rx beam in the case UE uses beamforming In Frequency Range 1 (FR1), beam forming is only used from the gNB perspective, and the UE uses a single beam, wherein the Rx/Tx beam alignment procedure consists in phases P-1 and P-2.

In FR2, both gNB and UE are expected to operate using "narrow" beams meaning that gNB operates using radiation patterns narrower than sector-wide beams and UE operates using radiation patterns narrower than omni-directional beams, as illustrated in FIG. 6. The reasons for the beam-based operations depend on the need for an increased array/antenna gain to compensate the higher coupling loss at mmWaves, but also due to technological limitations. For instance, the achievable power amplifier (PA) output power decreases as a function of the carrier frequency for any PA technology class, and when going to higher carrier frequencies more and more of the Effective/Equivalent Isotropic Radiated Power (EIRP) needs to be provided with an increased antenna/array gain. That can be achieved by narrowing the radiation patterns, i.e. using narrow beams/directions.

Beam-based operation requires a good beam correspondence between the gNB and UE, which is challenging to maintain since, with very narrow beams and, therefore, a large degree of freedom in the spatial domain, it is rather sensitive to blockages and beam misalignment between gNB and UE, as well as to mobility and rotation effects of the UE.

For a UE to be able to operate in RRC Connected mode in FR2, said UE must periodically perform beam management related operations, such as channel state information reference signals/synchronization signal blocks (CSI-RS/SSB) measurements, as well as to report periodically the result of these measurements to the network.

The UE may be configured with multiple beam configurations across panels and needs to align its narrow beams. The UE relies on the reference signals associated with NZP-CSI-RS-ResourceSet information element, defined in 3GPP TS38.214 and shown in FIG. 7*a*. The UE may be configured with the higher layer parameter repetition set to 'ON', received from the gNB, in order to perform its narrow beam alignment procedure. The repetition parameter indicates to the UE that the NZP-CSI-RS-ResourceSet are transmitted with the same downlink spatial filter, as defined in TS38.214.

The serving cell indicates to the UE the index of CSI-RS whose transmission will be repeated using "nzp-CSI-RS-Resources" information element and setting "repetition" information element to "on", as shown in FIG. 7*a*. The NZP-CSI-RS-ResourceId information element is used to identify one NZP-CSI-RS-Resource, as shown in FIG. 7*b*. Furthermore, a static UE capability maxNumberRxBeam is defined, where the UE indicates a single value for the preferred number of NZP CSI-RS resource repetitions per CSI-RS resource set.

The scheduling of such reference signals is fully controlled by the gNB to be sent in an aperiodic fashion. Hence, the UE is limited to waiting for the gNB to schedule such reference signals in order to align its Rx beam.

Figure 8:
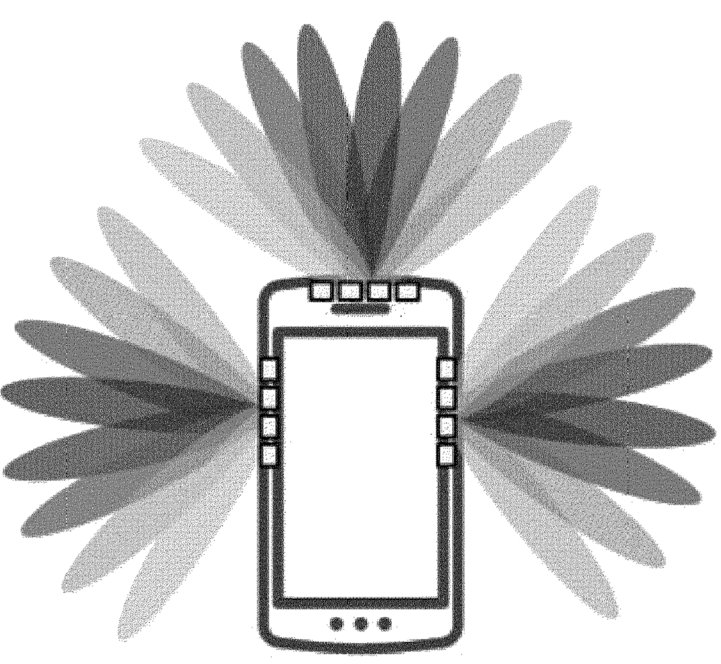
FIG. 8 shows an example of a multi-panel UE with at least 3 antenna panels.

As mentioned above, the UEs are likely to be built as multi-panel UEs with at least 3 panels, each of them being 1×4 antenna arrays exhibiting at least 8 different beam configurations, as illustrated in FIG. 8. However, the number of gNB scheduled CSI-RS repetitions may be much smaller than 24 as illustrated in FIG. 8, since a high number of repetitions is resource consuming, which may be problematic in loaded cell scenarios.

The gNB is in control of the repetition parameters used for the UE to align its narrow beam. However, the gNB does not have dynamic information on UE internal beam and panel management, and accordingly, the gNB may schedule NZP-CSI-RS-ResourceSet in a suboptimal manner. In other words, the UE may need repetitions for all of its resources to optimize the cell resources, while the gNB assigns only a few repetitions for the UE.

Accordingly, there is a need for a method for the UE to utilize its repetition budget (i.e. the available CSI-RS repetition reference signals) in order to optimize the beam search.

In the following, an enhanced method for beam scanning will be described in more detail, in accordance with various embodiments.

Figure 9:
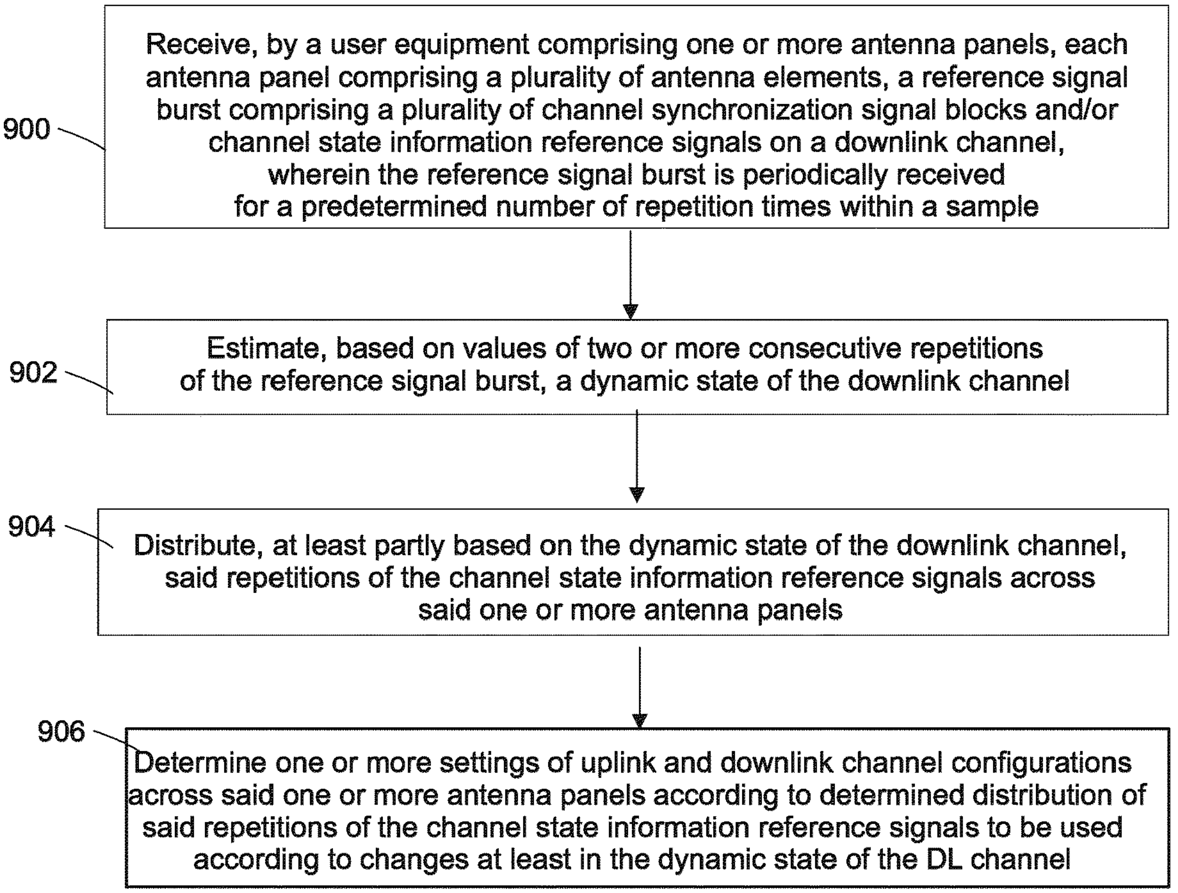
FIG. 9 shows a flow chart for a beam scanning and distribution procedure according to an embodiment.

The method, which is disclosed in flow chart of FIG. 9 as reflecting the operation of a terminal apparatus, such as a user equipment (UE), wherein the method comprises receiving (900), by a user equipment comprising one or more antenna panels, each antenna panel comprising a plurality of antenna elements, a reference signal burst comprising a plurality of synchronization signal blocks and/or channel state information reference signals, wherein the reference signal burst is periodically received for a predetermined number of repetition times within a sample; estimating (902), based on values of two or more consecutive repetitions of the reference signal burst, a dynamic state of the downlink channel; distributing (904), at least partly based on the dynamic state of the downlink channel, repetitions of the channel state information reference signals across said one or more antenna panels; and determining (906) one or more settings of uplink and downlink channel configurations across said one or more antenna panels according to determined distribution of said repetitions of the channel state information reference signals to be used according to changes at least in the dynamic state of the downlink channel.

Thus, as a result of distributing the repetitions of the CSI-RSs according to the method, the UE is able to adapt its narrow beam, and even its antenna panel(s), to the dynamically changing environment. Instead of using the repetitions only to align its narrow beam to the serving beam/panel as requested by the gNB, the UE uses the repetition distribution scheme to prepare for potential environmental changes.

The UE uses the repetition distribution scheme in order to estimate the channel environment and depending on dynamicity assessment, the UE may configure alternative links (panels and beam alignment) to be used when needed. After having compared reception of all repetitions on different UE narrow beams, the UE may choose the best narrow/wide beam/panel configuration for the following PDSCH reception and PUSCH transmission, but additionally the UE has configured one or more alternative links as back-up narrow beams, for example in case of blockage. Therefore, when the channel suddenly changes (i.e. power coming from different angular directions pointing towards different UE panels), the UE may take an alternative link in use and address the changes with an aligned Tx narrow beam, thus saving alignment resource and optimizing the throughput and/or reliability of the channel.

Thus, the UE estimates the channel environment using values across repetition sets of the reference signals received from a network element, such as the gNB. The estimation results in an assessment of the dynamic state of the channel environment. The method enables to distribute the repetitions differently depending on the assessment of the dynamic state of the channel, wherein based on the dynamic state, the UE may enhance link throughput and/or reliability by aligning its narrow beam and/or rank its alternative beams. Accordingly, in more static conditions the channel throughput may be prioritized, whereas in more dynamic channel conditions, reliability of downlink transmission may be prioritized to prevent link deterioration and even link failures.

According to an embodiment, the method comprises measuring received signal power level of said two or more consecutive repetitions of the reference signal burst using said one or more antenna panels in alternating manner; and determining candidate antenna panels for the downlink channel reception, wherein said candidate antenna panels include the antenna panel with the best value of the received signal power level and zero or more further antenna panels having the value of the received signal power level within a first predetermined threshold from the best value of the received signal power level.

Thus, the reference signal may comprise e.g. the channel state information reference signals/synchronization signal blocks (CSI-RS/SSB). The UE may receive e.g. the synchronization signal (SS) burst on different antenna panels consecutively, measure the reference signal received power level (RSRP) values for each antenna panel and determine the antenna panel with the best RSRP value. Moreover, a threshold may be set for determining candidate panels for the distribution of the repetitions of the reference signal bursts. The threshold value may be UE implementation specific, e.g. 3 dB, wherein all (i.e. zero or more) antenna panels having the RSRP value within said threshold from the RSRP value of the best antenna panel may be determined as the candidate panels.

According to an embodiment, the dynamic states of the downlink channel comprise at least the following: a directive channel, a semi-static channel, a dynamic channel.

A dynamic channel environment may appear e.g. in a situation where the UE itself is moving with a significant speed and/or the UE is surrounded by objects moving in relation to the UE, thereby causing blockage of beams and a risk of link deterioration and even link failures. In a semi-static channel environment, the channel conditions are sufficiently stable to configure the channel parameters to prioritize channel throughput over the channel reliability. A directive channel may be considered a specific case of the semi-static channel, wherein the incoming angles of the reference signal bursts may be determined to be sufficiently similar. For example, the distribution of Time-of-Arrival (ToA) of the received reference signal bursts may be compared with the ToA of the reference signal bursts received with the best RSRP value. Sufficiently similar ToA with the maximum component may indicate a high probability of single-cluster channel, i.e. a directive channel.

According to an embodiment, estimating the dynamic state of the downlink channel comprises measuring the received signal power level of said two or more consecutive repetitions of the reference signal burst using at least one antenna panel; and determining the dynamic state of the downlink channel based on whether values of the received signal power level of said two or more consecutive repetitions of the reference signal burst remain within a second predetermined threshold; wherein at least one value exceeding said second threshold indicates a dynamic downlink channel and all values remaining within said second threshold indicates a semi-static and/or directive downlink channel.

Herein, the UE may use e.g. the synchronization signal (SS) burst and measure the reference signal received power level (RSRP) values of a plurality of repetitions on the same antenna panel. The UE may use a second threshold value to determine the dynamic state of the channel. The second threshold value may as well be UE implementation specific, and it may be different or the same as the first threshold value, e.g. 3 dB. The UE monitors the same synchronization signal block (SSB) of consecutive bursts received on the same antenna panel, it may apply a threshold on the consecutive RSRP values, whereupon when two or more consecutive values are below said threshold, the UE can estimate a static or semi-static channel; else, a dynamic channel. The estimation of dynamicity of the channel may be performed, for example, by comparing a discrete RSRP mean over a plurality, such as 10-20, samples vs a mean over 2 or 3 samples, and comparing this value with said second predetermined threshold. The measurement may be performed on the same antenna panel, whereby a fast scanning of the dynamic state of the channel is achieved. On the other hand, the measurement may be performed across a plurality of antenna panels, which may yield higher accuracy at the cost of longer scanning time. Alternatively, channel estimation may be performed based on consecutive Power Delay Profile (PDP) and/or Channel Impulse Response (CIR) values to derive the relative variations (i.e. power level per time stamp) and assess the dynamic state of the channel.

According to an embodiment, the method comprises distributing, in response to estimating that the downlink channel is in a semi-static state, said repetitions of the channel state information reference signals across all beams of at least one candidate antenna panel.

In a semi-static channel environment, the UE preferably aims to prioritize the channel throughput, since conditions for the channel reliability are considered rather stable. Thus, the UE may determine the panel providing the best RSRP and the downlink serving beam related to it and distribute the repetitions of the channel state information reference signals across all beams of said antenna panel. On the other hand, the downlink serving beam may be associated with an antenna element close to or at the edge of the antenna panel, wherein the most optimized channel throughput may be obtained by distributing the repetitions of the channel state information reference signals across all beams of said antenna panel, as well as across all beams of the adjacent antenna panel.

According to an embodiment, the method comprises distributing, in response to estimating that the downlink channel is in a directive state, said repetitions of the channel state information reference signals across adjacent beams of a downlink serving beam. In a case of detecting a directive channel, the estimation of the direction of arrival of the reference signal bursts is rather confident, whereupon the UE may focus on the downlink serving beam and a few beams adjacent to it to further enhance the channel throughput.

According to an embodiment, the method comprises distributing, in response to estimating that the downlink channel is in a dynamic state, said repetitions of the channel state information reference signals across all beams of all candidate antenna panels.

In a dynamic channel environment, the UE preferably aims to prioritize the channel reliability rather than the channel throughput. In such situation, the UE typically cannot estimate any cluster of incoming power from the reference signals. Thus, in order to address the situation, the UE distributes the repetitions across a maximum angular domain i.e. across the available antenna panels.

According to an embodiment, the method comprises adapting, in response to the number of said repetitions of the channel state information reference signals scheduled by a network is smaller than the number of beams available for downlink channel reception, beamwidth of the beams available for downlink channel reception such that a desired angle of arrival is scannable with the beams available for downlink channel reception.

Thus, when the repetition number is smaller than the possibilities of UE Rx beams, the UE may adapt the Rx beamwidth to match the scanning angle. To further broaden the scanning angle, the UE may use multiple antenna panels and adapt the beamwidth of each Rx beam to the number of Rx beams needed to scan the desired angle. This may be done by activating a specific number of antenna elements per panel or by utilizing a specific codebook entry with a given phase shifter setting.

According to an embodiment, the method comprises determining that an operating state of the apparatus requires savings in power consumption, wherein only the antenna panel with the best value of the received signal power level is configured to be included in the candidate antenna panels.

Hence, the UE also takes power consumption into consideration in its distribution scheme of the repetitions, since comparing reference signals across panels represents an increased power consumption from powering all panels up simultaneously. When the UE detects a need to optimize its power consumption, it will limit the number of active antenna panels to the minimum, i.e. one active antenna panel only.

According to an embodiment, the method comprises averaging, for each active antenna panel, the received signal power level of the synchronization signal blocks over a plurality of consecutive synchronization signal bursts.

The UE may average the received power level over a configured number of samples, typically between 3 and 5 samples. Layer 1 filtering introduces a certain level of measurement averaging. For example, L1 filter tuning may depend on the mean and/or variance of the signal RSRP or SINR, wherein e.g. a small variance may result in short filter, and a large variance in longer filter. In other words, a sliding window length for averaging may be a function of signal variance. Layer 3 filtering for cell quality and related parameters used are specified in TS 38.331. The actual implementation about how and when the UE exactly performs the required measurements may vary among the UEs. When a sufficient number of samples has been scanned, the UE determines an average value of the RSRP values per active antenna panel.

It is noted that herein the term "averaging" refers to determining, e.g. calculating, an average value for a parameter from a group of parameter values. It is noted that the average value may refer to any value considered to represent a central tendency of said group of parameter values, such as an arithmetical mean, median or mode of the group of parameter values.

According to an embodiment, the method comprises determining, by the apparatus, whether to apply Layer 1 averaging.

Figure 10:
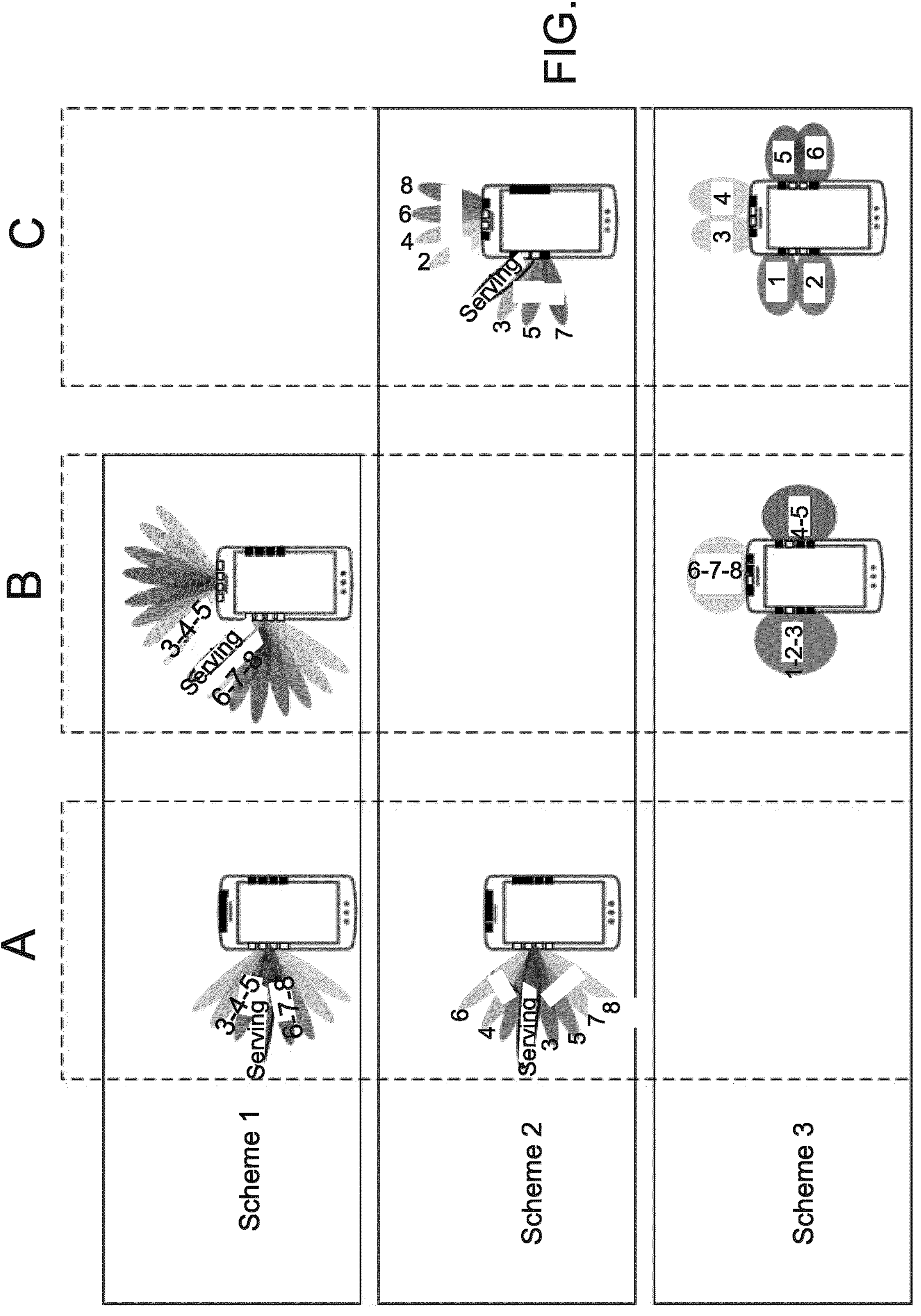
FIG. 10 shows an example of various schemes the UE may adopt for optimizing the distribution of reference signals according to an embodiment.

Thus, the UE may decide whether to apply Layer 1 averaging or not. For example, in fast fading conditions and depending on the schedule of the repetitions, the UE may decide or not to filter/average the values. When averaging is needed, the number of beams that the UE can test during a repetition set is reduced. This may lead to adapting the beamwidth of the UE Rx beams FIG. 10 illustrates various options that the UE may adopt for optimizing the distribution of CSI-RS repetitions according to an embodiment. The options are configured in terms of a plurality of schemes (Scheme 1, Scheme 2, Scheme 3) in a first direction, and in terms of the capabilities (A, B, C) of the UE in a second direction. Herein, A refers to a single-panel UE and B refers to multi-panel UE (MPUE). C refers to a situation where the UE uses a limited number of antenna elements of a multi-panel UE to adapt the beamwidths of the UE to a number of repetitions.

Scheme 1 focuses on adjacent beams, whether they are on the same panel (1A) or across panels (1B). Scheme 1 may be applied in a static or semi-static channel environment, where the throughput is prioritized.

Scheme 2 focuses on narrow beam scanning with the broadest angle overall, for example in a case where the UE cannot estimate a cluster of incoming power and/or the power angular delay profile is varying significantly. Depending on the number of panels, the UE may adapt the beamwidth to cover a maximum receive angle either on the single panel (2A) or on multiple panels (2C). In other words, the beamwidth is adapted such that the number of beams corresponds to the number of repetitions over the considered search space. Thus, the beamwidth is relative to the search space (e.g. 90 degrees for 1 panel, 180 degrees for 2 panels, etc.) divided by the number of repetitions.

Scheme 3 addresses the case where the UE cannot align its narrow beam due to an extremely dynamic channel environment. Moreover, the UE may not be able to use consecutive SS burst for averaging above a certain speed (e.g. if SS burst periodicity of 20 ms is too large compared to channel coherence time). Therefore, the UE utilizes the repetitions to enhance reliability and robustness to sudden channel variations. In order to further broaden the scan angle, the UE may use multiple panels and adapt the beamwidth of each Rx beam to the number of Rx beams needed to scan the desired angle. This may be done by activating a specific number of antenna elements per panel (3C) or by utilizing a specific codebook entry with a given phase shifter setting (3B).

The numbering in the schemes of FIG. 10 refers to the repetition instances, i.e. 8 repetitions. It is noted that this is only for illustration purposes and any other number of repetitions may be used as well. In the example of FIG. 10, the UE Rx beams are sequential. In some cases, multiple repetitions are performed over the same UE Rx beam (if averaging required i.e. L1 filtering decided by the UE), in other cases the repetitions are performed over the largest set of UE Rx beams (if the UE decides that L1 filtering/averaging is not required in the given channel conditions.

Figure 11:
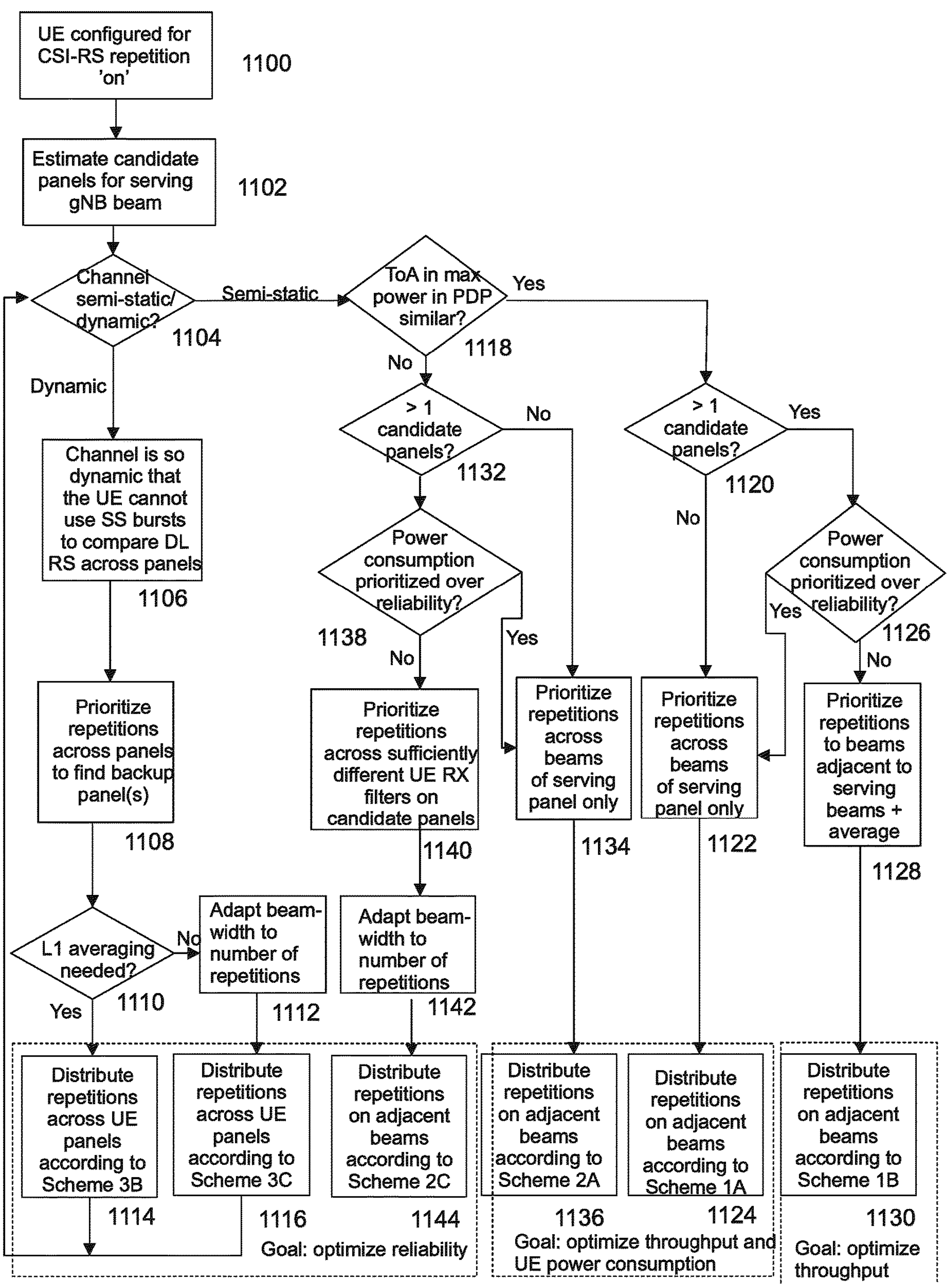
FIG. 11 shows a flow chart of beam scanning and distribution procedure according to various embodiments.

The method and at least some of the embodiments are illustrated in the flow chart of FIG. 11. It is noted that the numerals of the flow chart do not necessary reflect the actual order of events, but the events may take place in different order or in parallel. The method for enhanced beam scanning procedure in a UE starts by the UE receiving (1100) an indication from a network element, such as the gNB, that the CSI-RS repetition is set 'ON'. The indication may be received e.g. in NZP-CSI-RS_ResourceSet, as described above. This is an indication from the network about the increased probability that the channel environment may be in dynamic or at least semi-static state. In case of a static channel, it is assumed the network would not trigger CSI-RS repetition 'ON'.

The UE then estimates (1102) candidate panels for the serving gNB beam. The UE may receive the SS burst on different panels consecutively, measure the reference signal receiver power (RSRP) level values on each panel and compare the RSRP values. A first threshold proportional to the panel with best RSRP value may be used to determine the candidate panels. That is, all panels within the threshold value (e.g. 3 dB, but this may be UE implementation specific) may be included as candidate panels.

The UE then determines (1104) whether the channel is semi-static or dynamic. When the UE averages the same SSB of consecutive bursts received on the same UE panel, it may apply a second threshold on the consecutive RSRP value to determine how static the channel is. The second threshold may also be UE implementation specific, such as 3 dB. Alternatively, the UE may use the Power Delay Profile (PDP) and/or Channel Impulse Response (CIR) to determine how static the channel is.

If the channel is detected to be dynamic, the UE then prioritizes reliability over the throughput. The UE may even notice (1106) that it cannot use consecutive SS burst for averaging within the SS burst periodicity of 20 ms. The UE determines (1108) to use repetitions across the panels aiming to find a backup panel to enhance reliability and robustness to sudden channel variations.

The UE then determines (1110) whether L1 averaging is needed. Depending on current fast fading conditions and the schedule of the repetitions, the UE may decide or not to filter/average the values. When averaging is needed, the number of beams that the UE may scan during a repetition set is reduced. This may lead to adapting the beamwidth of the UE Rx beams.

If the UE decides not to use averaging, but the incoming angles of the CSI-RS are too uncertain (i.e. if the power angular delay profile is varying significantly compared to the UE search space beamwidth) and the UE needs to try all the beams, (i.e. in order to characterize the full incoming angular space of the radio channel and track the fast angular power channel variations, the UE would need to sweep across all its narrow beams), which may not be feasible with a limited number of repetitions available, then the UE may distribute (1112) the limited number of repetitions across the search space, i.e. the UE divides the search space by the limited number of UE beams to calculate the beamwidth of each beam. In this scenario, the UE turns on only the number of antenna elements that will lead to a beamwidth fitting the division of the search space. An example of this is illustrated in FIG. 10, in schemes 2C, 3B and 3C, where the active antenna elements are shown as bright blocks and the un-powered antenna elements are shown as dark blocks.

Depending on whether the UE decides to include filtering/averaging or not, the UE may distribute repetitions across the panels according to scheme 3B or 3C (1114; 1116). Both schemes 3B, 3C enable the UE to obtain very quickly a precise picture of the environment across panels, for example in a situation where such precise picture cannot be obtained from SS bursts in a very dynamic channel, wherein SS burst periodicity may be longer than channel coherency (SS burst default periodicity is 20 ms). The UE distribute repetitions across the panels to figure out alternative panels. A loop back to channel (re-) assessment (1104) may be applied to determine the dynamic state of the channel with the alternative antenna panels.

If the channel is detected (1104) to be semi-static, the UE may use the Power Delay Profile (PDP) from the channel assessment box (i.e. SSB or CSI-RS) and compare (1118) the time distribution of the signal received with maximum power. A substantially similar (i.e. within limits of a given threshold range) Time-of-Arrival (ToA) value of the maximum component across samples indicates a high probability of single-cluster channel. In such cases, the UE will prioritize adjacent beams for the beam search i.e. schemes 1A and 1B. On the other hand, if the ToA values of the maximum component across samples are different, it indicates a higher probability of a multi-cluster channel, wherein the direction of arrival is unknown and the UE needs to search in all directions.

With the assumption of a single-cluster channel, the UE checks (1120) the estimate of the candidate panels (1102). If only one candidate panel is found, the UE concludes to prioritize (1122) repetitions across beams of the serving panel only, and as a result, the UE distributes (1124) the repetitions on adjacent beams according to scheme 1A.

If more than one candidate panel is found (1120), the UE estimates (1126) whether it is in a situation where it needs to optimize its power consumption. If yes, the UE will limit the number of active panels to the minimum, i.e. 1 panel active only, whereupon the above steps of prioritizing (1122) repetitions across beam of the serving panel only, and distributing (1124) the repetitions on adjacent beams according to scheme 1A are used. If there is no need to optimize the power consumption of the UE, the UE concludes to prioritize (1128) repetitions across beams adjacent to the serving beams, possibly including averaging, and as a result, the UE distributes (1130) the repetitions on adjacent beams according to scheme 1B.

If the channel is detected (1104) to be semi-static, but there is low probability (1118) for a single-cluster channel, the UE checks (1132) the estimate of the candidate panels (1102). If only one candidate panel is found, the UE concludes to prioritize (1134) repetitions across beams of the serving panel only, and as a result, the UE distributes (1136) the repetitions on adjacent beams according to scheme 2A.

If more than one candidate panel is found (1132), the UE estimates (1138) whether it is in a situation where it needs to optimize its power consumption. If yes, the UE will limit the number of active panels to one panel only, whereupon the above steps of prioritizing (1134) repetitions across beams of the serving panel only, and distributing (1136) the repetitions on adjacent beams according to scheme 2A are used. If there is no need to optimize the power consumption of the UE, the UE concludes to prioritize (1140) repetitions across sufficiently different UE Rx filters on one or more candidate panels. The UE then adapts (1142) the beamwidth to the number of the repetitions, similarly to the step (1112) above. Then the UE distributes (1144) the repetitions on adjacent beams according to scheme 2C.

It can be concluded that schemes 1A, 1B and 2A may be used for optimizing the throughput, and schemes 1A and 2A may additionally be used in situation where a plurality of candidate panels exists but the UE is in a situation where it needs to optimize its power consumption. Schemes 2C, 3B and 3C may be used for optimizing the reliability in situations where link deterioration or even link failure is a risk.

An apparatus, such as a UE, according to an aspect comprises one or more antenna panels, each antenna panel comprising a plurality of antenna elements; means for receiving a reference signal burst comprising a plurality of synchronization signal blocks and/or state information reference signals on a downlink channel, wherein the reference signal burst is periodically received for a predetermined number of repetition times within a sample; means for estimating, based on values of two or more consecutive repetitions of the reference signal burst, a dynamic state of the downlink channel; means for distributing, at least partly based on the dynamic state of the downlink channel, repetitions of the channel state information reference signals across said one or more antenna panels; and means for determining one or more settings of uplink and downlink channel configurations across said one or more antenna panels according to determined distribution of said repetitions of the channel state information reference signals to be used according to changes at least in the dynamic state of the downlink channel.

According to an embodiment, the apparatus may comprise means for measuring received signal power level of said two or more consecutive repetitions of the reference signal burst using said one or more antenna panels in alternating manner; and means for determining candidate antenna panels for the downlink channel reception, wherein said candidate antenna panels include the antenna panel with the best value of the received signal power level and zero or more further antenna panels having the value of the received signal power level within a first predetermined threshold from the best value of the received signal power level.

According to an embodiment, the dynamic states of the downlink channel comprise at least the following: a directive channel, a semi-static channel, a dynamic channel.

According to an embodiment, said means for estimating the dynamic state of the downlink channel may comprise means for measuring the received signal power level of said two or more consecutive repetitions of the reference signal burst using one antenna panel; and means for determining the dynamic state of the downlink channel based on whether values of the received signal power level of said two or more consecutive repetitions of the reference signal burst remain within a second predetermined threshold; wherein at least one value exceeding said second threshold indicates a dynamic downlink channel and all values remaining within said second threshold indicates a semi-static and/or directive downlink channel.

According to an embodiment, the reference signal burst is a synchronization signal burst.

According to an embodiment, said means for distributing are configured to, in response to estimating that the downlink channel is in a semi-static state, distribute said repetitions of the channel state information reference signals across all beams of at least one candidate antenna panel.

According to an embodiment, said means for distributing are configured to, in response to estimating that the downlink channel is in a directive state, distribute said repetitions of the channel state information reference signals across adjacent beams of a downlink serving beam.

According to an embodiment, said means for distributing are configured to, in response to estimating that the downlink channel is in a dynamic state, distribute said repetitions of the channel state information reference signals across all beams of all candidate antenna panels.

According to an embodiment, the apparatus may comprise means for adapting, in response to the number of said repetitions of the channel state information reference signals scheduled by a network is smaller than the number of beams available for downlink channel reception, beamwidth of the beams available for downlink channel reception such that a desired angle of arrival is scannable with the beams available for downlink channel reception.

According to an embodiment, the apparatus may comprise means for determining that an operating state of the apparatus requires savings in power consumption, wherein said means for determining candidate antenna panels are configured to include only the antenna panel with the best value of the received signal power level.

According to an embodiment, the apparatus may comprise means for averaging, for each active antenna panel, the received signal power level of the synchronization signal blocks over a plurality of consecutive synchronization signal bursts.

According to an embodiment, the apparatus may comprise means for determining whether to apply Layer 1 averaging.

An apparatus according to a further aspect comprises a plurality of antenna panels, each antenna panel comprising a plurality of antenna elements, at least one processor and at least one memory, said at least one memory stored with computer program code thereon, the at least one memory and the computer program code configured to, with the at least one processor, cause the apparatus at least to perform: receive a reference signal burst comprising a plurality of channel synchronization signal blocks and/or state information reference signals on a downlink channel, wherein the reference signal burst is periodically received for a predetermined number of repetition times within a sample; estimate, based on values of two or more consecutive repetitions of the reference signal burst, a dynamic state of the downlink channel; distribute, at least partly based on the dynamic state of the downlink channel, repetitions of the channel state information reference signals across said one or more antenna panels; and determine one or more settings of uplink and downlink channel configurations across said one or more antenna panels according to determined distribution of said repetitions of the channel state information reference signals to be used according to changes at least in the dynamic state of the downlink channel.

Such apparatuses may comprise e.g. the functional units disclosed in any of the FIGS. 1-3 and 4*a* for implementing the embodiments.

A further aspect relates to a computer program product, stored on a non-transitory memory medium, comprising computer program code, which when executed by at least one processor, causes an apparatus at least to perform: receiving, by one or more antenna panels of said apparatus, each antenna panel comprising a plurality of antenna elements, a reference signal burst comprising a plurality of synchronization signal blocks and/or channel state information reference signals on a downlink channel, wherein the reference signal burst is periodically received for a predetermined number of repetition times within a sample; estimating, based on values of two or more consecutive repetitions of the reference signal burst, a dynamic state of the downlink channel; distributing, at least partly based on the dynamic state of the downlink channel, repetitions of the channel state information reference signals across said one or more antenna panels; and determining one or more settings of uplink and downlink channel configurations across said one or more antenna panels according to determined distribution of said repetitions of the channel state information reference signals to be used according to changes at least in the dynamic state of the downlink channel.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus, comprising:

one or more antenna panels, the one or more antenna panels comprising a plurality of antenna elements;

at least one processor; and at least one memory storing instructions that, when executed with the at least one processor, cause the apparatus to perform:

receiving a reference signal burst comprising at least one of a plurality of synchronization signal blocks or channel state information reference signals on a downlink channel, wherein the reference signal burst is periodically received for a predetermined number of repetition times within a sample;

estimating, based on values of two or more consecutive repetitions of the reference signal burst, a dynamic state of the downlink channel;

distributing, at least partly based on the dynamic state of the downlink channel, repetitions of the channel state information reference signals across said one or more antenna panels; and determining one or more settings of uplink and downlink channel configurations across said one or more antenna panels according to determined distribution of said repetitions of the channel state information reference signals to be used according to changes at least in the dynamic state of the downlink channel.

2. The apparatus according to claim 1, wherein the instructions, when executed with the at least one processor, further cause the apparatus to perform:

measuring received signal power level of said two or more consecutive repetitions of the reference signal burst using said one or more antenna panels in alternating manner; and determining candidate antenna panels for a downlink channel reception, wherein said candidate antenna panels include an antenna panel with a best value of the received signal power level and zero or more further antenna panels having a value of the received signal power level within a first predetermined threshold from the best value of the received signal power level.

3. The apparatus according to claim 1, wherein the dynamic state of the downlink channel comprise at least the following: a directive channel, a semi-static channel, or a dynamic channel.

4. The apparatus according to claim 3, wherein the instructions, when executed with the at least one processor, cause the apparatus to perform:

measuring a received signal power level of said two or more consecutive repetitions of the reference signal burst using one antenna panel; and determining the dynamic state of the downlink channel based on whether values of the received signal power level of said two or more consecutive repetitions of the reference signal burst remain within a second predetermined threshold;

wherein at least one value exceeding said second threshold indicates a dynamic downlink channel and values remaining within said second threshold indicate at least one of the semi-static channel or the directive channel.

5. The apparatus according to claim 1, wherein the reference signal burst is a synchronization signal burst.

6. The apparatus according to claim 3, wherein the instructions, when executed with the at least one processor, cause the apparatus to, in response to estimating that the downlink channel is in a semi-static state, distribute said repetitions of the channel state information reference signals across beams of at least one candidate antenna panel.

7. The apparatus according to claim 3, wherein the instructions, when executed with the at least one processor, cause the apparatus to, in response to estimating that the downlink channel is in a directive state, distribute said repetitions of the channel state information reference signals across adjacent beams of a downlink serving beam.

8. The apparatus according to claim 3, wherein the instructions, when executed with the at least one processor, cause the apparatus to, in response to estimating that the downlink channel is in a dynamic state, distribute said repetitions of the channel state information reference signals across beams of the candidate antenna panels.

9. The apparatus according to claim 1, wherein the instructions, when executed with the at least one processor, cause the apparatus to perform adapting, in response to a number of said repetitions of the channel state information reference signals scheduled with a network being smaller than a number of beams available for downlink channel reception, beamwidth of the beams available for downlink channel reception such that a desired angle of arrival is scannable with the beams available for downlink channel reception.

10. The apparatus according to claim 2, wherein the instructions, when executed with the at least one processor, cause the apparatus to perform determining that an operating state of the apparatus requires savings in power consumption, wherein said determining of candidate antenna panels includes the antenna panel with the best value of the received signal power level.

11. The apparatus according to claim 1, wherein the instructions, when executed with the at least one processor, cause the apparatus to perform averaging, for the active antenna panels, a received signal power level of the synchronization signal blocks over a plurality of consecutive synchronization signal bursts.

12. The apparatus according to claim 11, wherein the instructions, when executed with the at least one processor, cause the apparatus to perform determining whether to apply Layer 1 averaging.

13. A method, comprising:

receiving, with a user equipment comprising one or more antenna panels, the one or more antenna panels comprising a plurality of antenna elements, a reference signal burst comprising at least one of a plurality of synchronization signal blocks or channel state information reference signals on a downlink channel, wherein the reference signal burst is periodically received for a predetermined number of repetition times within a sample;

estimating, based on values of two or more consecutive repetitions of the reference signal burst, a dynamic state of the downlink channel;

distributing, at least partly based on the dynamic state of the downlink channel, repetitions of the channel state information reference signals across said one or more antenna panels; and determining one or more settings of uplink and downlink channel configurations across said one or more antenna panels according to determined distribution of said repetitions of the channel state information reference signals to be used according to changes at least in the dynamic state of the downlink channel.

14. The method according to claim 13, comprising measuring received signal power level of said two or more consecutive repetitions of the reference signal burst using said one or more antenna panels in alternating manner; and determining candidate antenna panels for a downlink channel reception, wherein said candidate antenna panels include an antenna panel with a best value of the received signal power level and zero or more further antenna panels having a value of the received signal power level within a first predetermined threshold from the best value of the received signal power level.

15. The method according to claim 13, wherein the dynamic state of the downlink channel comprise at least the following: a directive channel, a semi-static channel, or a dynamic channel.

16. The method according to claim 15, wherein said estimating the dynamic state of the downlink channel comprises measuring a received signal power level of said two or more consecutive repetitions of the reference signal burst using one antenna panel; and determining the dynamic state of the downlink channel based on whether values of the received signal power level of said two or more consecutive repetitions of the reference signal burst remain within a second predetermined threshold;

wherein at least one value exceeding said second threshold indicates a dynamic downlink channel and values remaining within said second threshold indicate at least one of the semi-static channel or the directive channel.

17. The method according to claim 13, wherein the reference signal burst is a synchronization signal burst.

18. The method according to claim 15, wherein the method comprises, in response to estimating that the downlink channel is in a semi-static state, distributing said repetitions of the channel state information reference signals across beams of at least one candidate antenna panel.

19. The method according to claim 15, wherein the method comprises, in response to estimating that the downlink channel is in a directive state, distributing said repetitions of the channel state information reference signals across adjacent beams of a downlink serving beam.

20. The method according to claim 15, wherein the method comprises, in response to estimating that the downlink channel is in a dynamic state, distributing said repetitions of the channel state information reference signals across beams of the candidate antenna panels.

21. The method according to claim 13, comprising adapting, in response to a number of said repetitions of the channel state information reference signals scheduled with a network being smaller than a number of beams available for downlink channel reception, beamwidth of the beams available for downlink channel reception such that a desired angle of arrival is scannable with the beams available for downlink channel reception.

22. The method according to claim 14, comprising determining that an operating state of the apparatus requires savings in power consumption, wherein said determining of candidate antenna panels includes the antenna panel with the best value of the received signal power level.

23. The method according to claim 13, comprising averaging, for the active antenna panels, a received signal power level of the synchronization signal blocks over a plurality of consecutive synchronization signal bursts.

24. The method according to claim 23, comprising determining whether to apply Layer 1 averaging.

25. A non-transitory program storage device readable with an apparatus, tangibly embodying a program of instructions executable with the apparatus for performing:

receiving, with one or more antenna panels of said apparatus, the one or more antenna panels comprising a plurality of antenna elements, a reference signal burst comprising a plurality of synchronization signal blocks or channel state information reference signals on a downlink channel, wherein the reference signal burst is periodically received for a predetermined number of repetition times within a sample;

estimating, based on values of two or more consecutive repetitions of the reference signal burst, a dynamic state of the downlink channel;

distributing, at least partly based on the dynamic state of the downlink channel, repetitions of the channel state information reference signals across said one or more antenna panels; and determining one or more settings of uplink and downlink channel configurations across said one or more antenna panels according to determined distribution of said repetitions of the channel state information reference signals to be used according to changes at least in the dynamic state of the downlink channel.

* * * * *